(12) United States Patent
Ernst et al.

(10) Patent No.: US 11,569,045 B2
(45) Date of Patent: Jan. 31, 2023

(54) GRID INFLUENCING SYSTEM

(71) Applicant: Siemens Energy Global GmbH & Co. KG, Munich (DE)

(72) Inventors: Patrik Ernst, Mühlhausen (DE); Andreas Haselbauer, Erlangen (DE); Christian Schacherer, Deining (DE); Martin Battermann, Nuremberg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/050,679

(22) PCT Filed: Apr. 1, 2019

(86) PCT No.: PCT/EP2019/058157
§ 371 (c)(1),
(2) Date: Oct. 26, 2020

(87) PCT Pub. No.: WO2019/206570
PCT Pub. Date: Oct. 31, 2019

(65) Prior Publication Data
US 2021/0241980 A1    Aug. 5, 2021

(30) Foreign Application Priority Data

Apr. 27, 2018  (EP) ..................................... 18169854
May 15, 2018  (EP) ..................................... 18172418

(51) Int. Cl.
*H01H 1/02* (2006.01)
*H01H 33/666* (2006.01)
*H02H 9/06* (2006.01)

(52) U.S. Cl.
CPC ...... *H01H 1/0203* (2013.01); *H01H 33/6661* (2013.01); *H02H 9/06* (2013.01); *H01H 2001/0205* (2013.01)

(58) Field of Classification Search
CPC .. H01H 1/0203; H01H 33/6661; H01H 79/00; H01H 2001/0205; H02H 9/06;
(Continued)

(56) References Cited

U.S. PATENT DOCUMENTS 3,319,121 A  *  5/1967  Lee .......................... H02H 7/16
                                                361/16
3,489,873 A      1/1970  Kurtz ........................... 200/144
(Continued)

FOREIGN PATENT DOCUMENTS

CN    105633917 A    6/2016    ............... H02H 7/12
GB    787 846        12/1957    ........... H01H 33/664

OTHER PUBLICATIONS

Search Report for International Application No. PCT/EP2019/058157, 11 pages, dated May 15, 2019.
(Continued)

*Primary Examiner* — William A Bolton
(74) *Attorney, Agent, or Firm* — Slayden Grubert Beard PLLC

(57) ABSTRACT

Various embodiments of the teachings herein include a grid influencing system for a power supply grid comprising: a current-conducting grid influencing component; and a vacuum circuit breaker including a vacuum circuit breaker tube containing an at least partly integrated pre-arcing device for actively generating an arc between two contacts.

4 Claims, 5 Drawing Sheets

(58) Field of Classification Search
CPC ......... H02H 7/16; H02H 7/1203; H01J 21/04; H01J 21/08; H01T 21/06; H01T 2/00; H02J 3/1814; H02J 3/06; H02J 3/28; Y02E 40/10
USPC ......... 218/118, 119, 152; 313/146; 315/326; 317/12 A
See application file for complete search history.

(56) References Cited

U.S. PATENT DOCUMENTS

| | | | | |
|---|---|---|---|---|
| 3,532,920 A | * | 10/1970 | Delchar | H01H 33/66 313/107 |
| 3,679,474 A | | 7/1972 | Rich | 313/217 |
| 3,816,798 A | | 6/1974 | Lafferty | 315/330 |
| 4,224,550 A | * | 9/1980 | Rich | H01H 33/6646 218/118 |
| 5,038,082 A | * | 8/1991 | Arita | H01J 17/56 315/326 |
| 8,319,136 B2 | * | 11/2012 | Byron | H01H 33/66 218/126 |
| 8,861,144 B2 | * | 10/2014 | Shea | H01T 2/02 361/13 |

OTHER PUBLICATIONS

European Office Action, Application No. 18172418.8, 5 pages, dated Jan. 4, 2022.

* cited by examiner

GRID INFLUENCING SYSTEM

CROSS-REFERENCE TO RELATED APPLICATIONS

This application is a U.S. National Stage Application of International Application No. PCT/EP2019/058157 filed Apr. 1, 2019, which designates the United States of America, and claims priority to EP Application No. 18172418.8 filed May 15, 2018 and EP Application No. 18169854.9 filed Apr. 27, 2018, the contents of which are hereby incorporated by reference in their entirety.

TECHNICAL FIELD

The present disclosure relates to grid influencing systems.

BACKGROUND

In grid influencing systems such as systems for increasing or controlling the transmission power of high-voltage grids such as series compensation systems (referred to as Fixed Series Capacitor—FSC) or in power flow controllers (Universal Power Flow Control—UPFC or APCU), it is necessary to provide protective devices in the case of a grid fault, for example a short circuit or ground fault. The protection consists of a surge arrester and a bypass current path, which is closed in an electrically conductive manner if a grid fault occurs. The fastest possible reaction in the case of a grid fault is crucial for the protective effect. The bypass current path should typically be closed within two milliseconds (ms) and subsequently be able to carry the fault current for a time of a few seconds.

In known solutions, power semiconductors or a combination of a spark gap and circuit breakers are usually used for the exemplary applications described. In this case, power semiconductors are comparatively cost-intensive since they have to be designed for the short-circuit current for a time that is comparatively long for them. On the other hand, the parallel arrangement of a spark gap and a circuit breaker that is likewise used requires a very large structural space. Moreover, by virtue of its open design, the spark gap is susceptible to environmental influences such as ice or exposure to dust.

SUMMARY

The teachings of the present disclosure may be used to provide a grid influencing system comprising a device for generating a bypass current path, wherein said device requires less structural space and is less sensitive to environmental influences by comparison with the prior art. For example, some embodiments include a grid influencing system of a power supply grid (4) comprising a current-conducting grid influencing component (6) and comprising a short-circuiting device (8), wherein the short-circuiting device (8) comprises a circuit breaker (10), characterized in that the circuit breaker (10) is a vacuum circuit breaker comprising a vacuum circuit breaker tube containing an at least partly integrated pre-arcing device (12) for actively generating an arc (14) between two contacts (19, 34).

In some embodiments, the circuit breaker (10) has a contact system (16) comprising two switching contacts (18, 19), which are movable translationally with respect to one another, and the contact system has an arc current path (20) and a continuous current path (22), which are geometrically separated from one another at least in the contact region.

In some embodiments, the pre-arcing device (12) is provided with an ignition electrode (24) for igniting the arc (14) along an arc current path (20).

In some embodiments, contact surfaces (26) of the arc current path (20) in a closed state of the circuit breaker (10) are arranged with no contact with respect to one another.

In some embodiments, the contact system (16) has a moving contact (18) and a fixed contact (19), wherein a contact pin (30) is provided, which is able to be mechanically coupled firstly to a drive unit and secondly to the moving contact (18), and in that the contact pin is furthermore mechanically coupled to a pre-arcing contact (14) and the pre-arcing contact is mounted such that it is movable translationally along a switching axis (36) independently of the moving contact (18).

In some embodiments, the grid influencing system (1) is a series compensation system (3).

In some embodiments, the grid influencing system (1) is a unified power flow controller (2).

BRIEF DESCRIPTION OF THE DRAWINGS

Further configurations and further features of the teachings herein are explained in greater detail with reference to the following figures. They are purely exemplary configurations which do not constitute any restriction of the scope of protection. Features having the same designation but different configurations are provided with the same reference sign in this case. In the figures.

DETAILED DESCRIPTION

Figure 1:
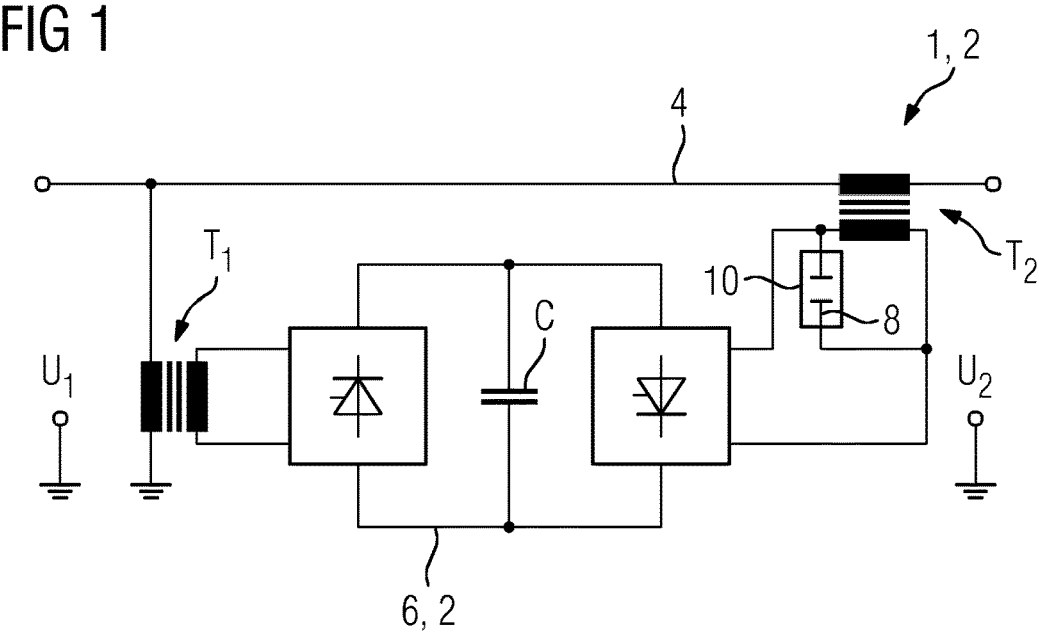
FIG. 1 shows a schematic circuit diagram of a grid influencing system in the form of a unified power flow controller.

The teachings of the present disclosure may be embodied in a grid influencing system for influencing a power supply grid. In some embodiments, there is a current-conducting grid influencing component and secondly a short-circuiting device. In some embodiments, the short-circuiting device comprises a circuit breaker, wherein the latter is embodied as a vacuum circuit breaker comprising a vacuum circuit breaker tube. In some embodiments, the vacuum circuit breaker tube comprises a pre-arcing device for actively generating an arc between two contacts.

In some embodiments, a vacuum circuit breaker comprises a modified vacuum circuit breaker tube and a drive. The pre-arcing device is at least partly arranged in the vacuum circuit breaker tube, and generates an arc along an arc current path between two contacts of the tube when a grid fault occurs. Said arc is current-carrying for a few milliseconds for as long as the mechanical contacts of the circuit breaker tube need to come together mechanically and thus produce a continuous current path. That means that when a grid fault occurs, a bypass current path is closed so fast that the grid influencing component at the grid influencing system does not incur damage. This is ensured by the vacuum circuit breaker described.

By comparison with the prior art, the grid influencing system described has the advantage that the short-circuiting device employed, namely the vacuum circuit breaker, is able to produce a corresponding protective effect for the influencing components in an integrated device in a confined structural space, cost-effectively and in a manner protected from ambient influences.

In some embodiments, the circuit breaker tube has a contact system comprising the two contacts mentioned previously, wherein these contacts are movable translationally with respect to one another. In this case, the contact system is configured in such a way that it firstly has the arc current path and that it secondly comprises a continuous current path, wherein these two current paths are geometrically separated from one another at least in the contact region.

The separation of the arc current path from the continuous current path has the effect that contact surfaces of the continuous current path are not burdened by the formation of an arc relative to their surface. The arc current path takes a different geometric course than the continuous current path. In some embodiments, upon the closing of the contact system for establishing the continuous current path, no arc arises between these two contact surfaces, for which reason no instances of fusion and no instances of welding arise between the contact surfaces of the continuous current path. Upon the contact system being opened again, such instances of welding would result in surface damage that could in turn adversely influence the electric field prevailing between the contacts. In some embodiments, contact surfaces of the arc current path remain without contact even in the closed state. The contact surfaces of the arc current path are preferably geometrically separated from the contact surfaces of the continuous current path as mentioned.

In some embodiments, the pre-arcing device has an ignition electrode for igniting the arc along the arc current path. The ignition electrode serves to form an arc when an ignition signal arrives. To that end, the pre-arcing device preferably also comprises ignition electronics, which can optionally also be arranged outside the circuit breaker tube.

In some embodiments, the short-circuiting device of the grid influencing system, that is to say the circuit breaker tube, has a contact system comprising a moving contact and a fixed contact. The movement of the moving contact is effected with the aid of a contact pin, which firstly is mechanically coupled to a drive unit and which secondly is able to be mechanically coupled to the moving contact. The contact pin is mechanically coupled to a pre-arcing contact, which acts as an ignition electrode, wherein the pre-arcing contact is mounted such that it is movable translationally along a switching axis independently of the moving contact.

This configuration provides that the pre-arcing contact has a significantly lower mass than the moving contact and can thus be moved significantly faster with the same drive energy. This fast movement of the pre-arcing contact brings about an immediate (less than 10 ms) triggering of the arc between the pre-arcing contact and a counterpart in the fixed contact.

In some embodiments, the grid influencing system is configured in the form of a series compensation system or in the form of a power flow controller.

FIG. 1 illustrates a basic circuit diagram of a grid influencing system in the form of a unified power flow controller (UPFC) 2. A power flow controller 2 is a grid influencing system 1 which serves to make it possible, in national and meshed electricity grids, to control and influence the transmitted electrical power in individual lines such as overhead lines in a targeted manner. Power flow controllers 2 can thus be used to fulfill specific, contractually agreed power transfers in a targeted manner in meshed grids.

The manner of operation of the power flow controller 2 will not be discussed in more specific detail at this juncture. It is merely stated that energy is tapped off from the electricity grid 4 with the aid of transformers T1, is converted from alternating current into direct current with the aid of converters and is converted into alternating current again in order thus to influence the impedance in the grid by way of a second transformer T2 by means of the alteration of the phase angle between current and voltage. However, a short-circuiting device 8 has to be provided for a short-circuit situation, which short-circuiting device here is configured in the form of a circuit breaker 10. The manner of operation of the circuit breaker 10 will also be discussed below.

Figure 2:
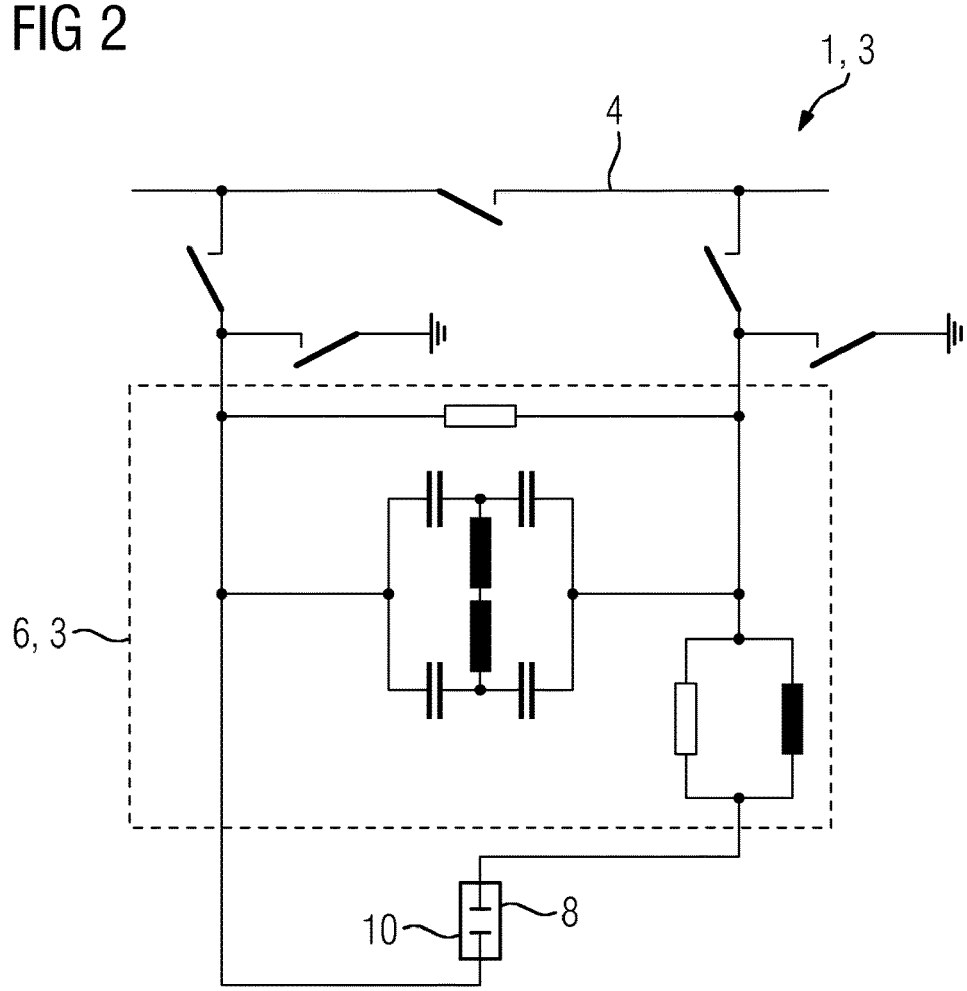
FIG. 2 shows a schematic circuit diagram of a grid influencing system in the form of a series compensation system.

FIG. 2 illustrates a basic circuit diagram of a grid influencing system 1 in the form of a series compensation system 3, the method of operation of which will likewise be discussed only briefly. In a transmission system, the maximum magnitude of the active power that can be transmitted via a line or via cables is inversely proportional to the reactance of the line. By compensating for the reactance to a certain degree using a series capacitor, it is possible to realize an electrically shorter path and to achieve a higher transmission of active power. Since the series compensator is self-regulating—i.e. the power is directly (and without monitoring) proportional to the grid current—it compensates for the voltage drop that arises across the reactance. The voltage stability in the transmission grid is increased as a result. The series compensation system 3 also requires a corresponding short-circuiting device which, in the case of a grid fault or a short circuit in the grid, disconnects the series compensation system from the grid very rapidly and thus protects the system from relatively great damage. In the series compensation system, too, a short-circuiting device comprising a switch is used, which switch is explained in greater detail below.

Figure 3:
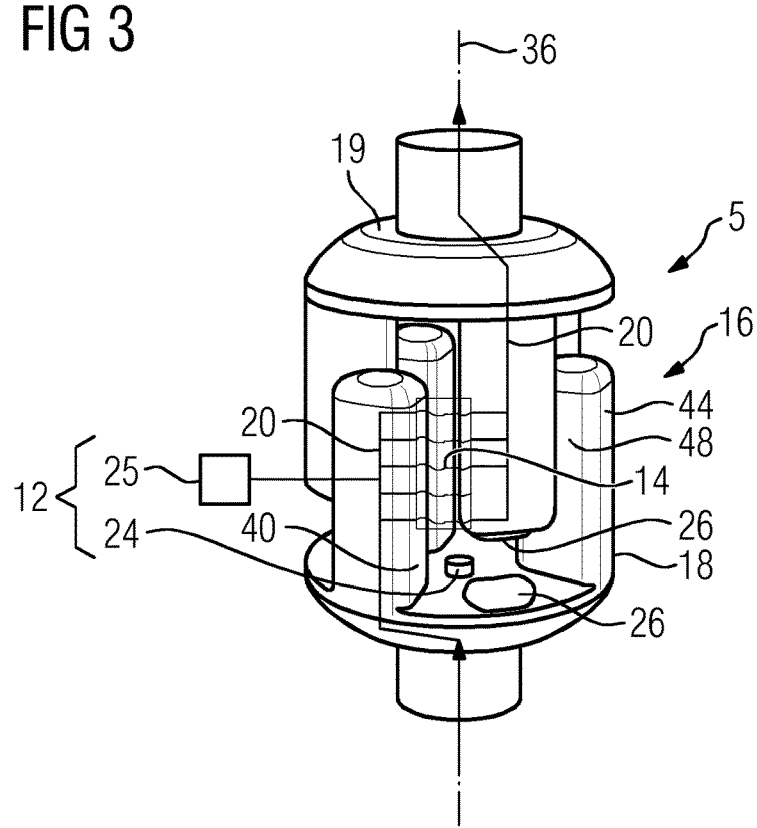
FIG. 3 shows a contact system comprising two contacts with contact fingers in the open state.
Figure 4:
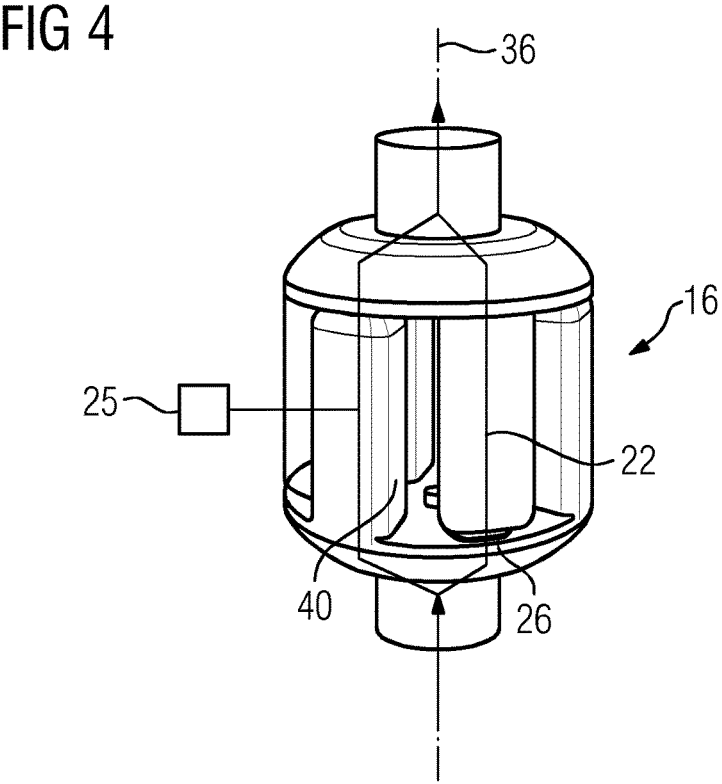
FIG. 4 shows the contact system from FIG. 1 in the closed state.

FIGS. 3 and 4 in each case illustrate a contact system 5 of a vacuum circuit breaker tube 11. For the sake of simplicity, these figures only show the contact system 5; a basic schematic cross section through a vacuum circuit breaker tube 11 is given in FIGS. 5-7. In principle, the contact system 5 in accordance with FIGS. 3 and 4, applied analogously, is also part of a vacuum circuit breaker tube 11 in accordance with FIG. 5.

In this case, the vacuum circuit breaker tube 11 has a housing 4, which, as already explained in FIGS. 3 and 4, is not illustrated for the sake of simplicity. There is a vacuum in this housing 13, which means that a reduced pressure relative to the atmospheric pressure prevails in this region; a high vacuum (less than $10^{-3}$ hPa) may be present. In contrast to gas-insulated circuit breakers, no quenching gas or no insulating gas is present in the vacuum circuit breaker tube 11 described.

The contact system 5 has two contacts; in principle, both contacts could be configured as moving contacts, but in general only one contact 18 is configured as a moving contact, and a second contact is a fixed contact 19. In this case, the moving contact 18 is connected to a drive (not illustrated here). The contacts 18 and 19 in FIGS. 3 and 4 here have fingerlike, intermeshing extensions 44 oriented along a switching axis 36. In the examples in FIGS. 1 and 2, three fingerlike extensions 44 of each contact are illustrated; in principle, the number can vary, of course. It may also be expedient for each contact 18, 19 to have only one extension 44; the latter can then have for example a half-ring-shaped cross section in each case.

Furthermore, the vacuum circuit breaker tube is equipped with a pre-arcing device 12, wherein the pre-arcing device 12 has at least one ignition electrode 24 and preferably ignition electronics 25, which in the case of a short circuit, when the switch has to be closed very rapidly, supply an electrical signal to the ignition electrode 24. That has the effect that electrical charges are present in the region of contact surfaces 40 for a so-called arc current path 20 and a flashover in the form of an arc occurs between two contact surfaces 40. In the event of a grid fault occurring, therefore, firstly the contact is bridged by the arc 14 ignited, as described. While the arc 14 conducts the current, the contacts 18 and 19 are then mechanically closed by the mechanical drive, giving rise to contact between contact surfaces 26 of a continuous current path 22.

This sequence is therefore expedient since the arc 14 can be ignited faster (generally in less than 4 ms) and the current can thus flow via said arc for a short time until the slower mechanical contact 18, 19 has closed.

In this way, an effect that is the same as is the case from the combination of a so-called spark gap with a circuit breaker in accordance with the prior art is achieved in an integrated manner in a vacuum circuit breaker tube 11. By virtue of the design described, however, a significantly smaller structural space is required and, at the same time, the vacuum circuit breaker tube 11 is significantly less susceptible to environmental influences compared with a so-called spark gap, for example.

In some embodiments, there is a geometrically combined arc current path 20 and continuous current path 22. That is to say that the arc 14 could be effected between two contact surfaces 26 of planar configuration of the contacts 18 and 19. As a result of the deflagration of the contact surfaces 26 with the arc 14, however, a melting zone arises at the surface, such that the contact surfaces 26 can weld together when the contacts 18 and 19 are closed. Upon reopening, this weld is torn apart and pointed or sharp-edged surface roughnesses arise, which can adversely influence the electric field during the opening and closing of the contacts 18 and 19. For this reason, it is expedient, as illustrated in FIGS. 3 and 4, for the arc current path 20 to be geometrically separated from the continuous current path 22.

The arc current path 20 is illustrated in FIG. 3. It extends along the extensions 44 and the arc current path 20 then jumps over flanks 46 of the extensions 44 at contact surfaces 24 of the arc current 20 of the corresponding flank 46 and of the corresponding contact surface 24. FIG. 4 illustrates the closed state of the contact system 5; the arc 14 between the flanks 46 has extinguished and the current flows via the continuous current path 22, the contact surfaces 26 of the two contacts 18 and 19 touching one another. This current flow is now continuously stable.

In some embodiments, in an integrated manner in a switch firstly an arc is switched, which arc leads very rapidly to a current flow until the slower mechanical switching process via the continuous current path is provided. In this case, the continuous current path 22 and the arc current path 18 are geometrically separated from one another, which can be fashioned by the arrangement of the fingerlike extensions 44. In the closed state of the contact system 5, the contact surfaces 24 for the arc current path 18 are not in contact with one another. Consequently, welding between the individual contact surfaces 24 of the arc current path does not occur either.

Figure 5:
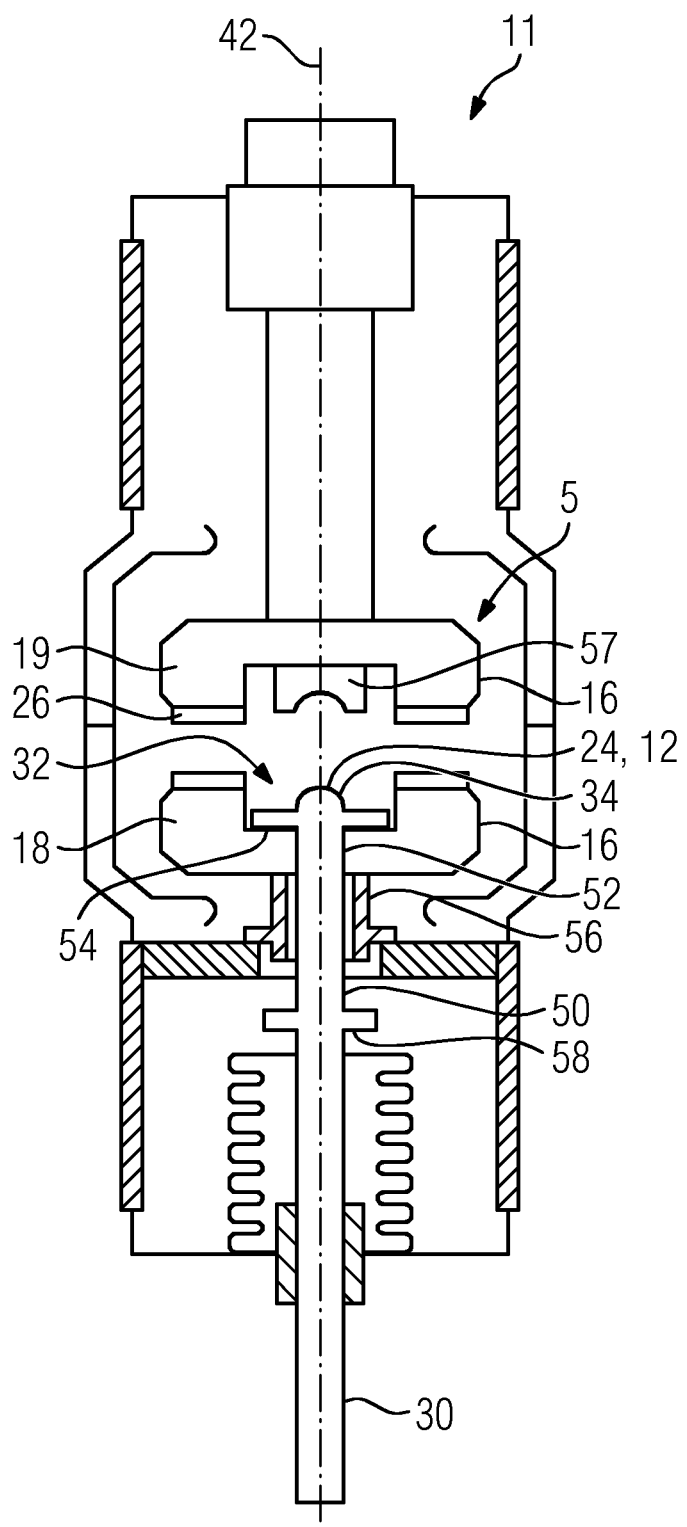
FIG. 5 shows a vacuum circuit breaker tube comprising a contact system and a pot-shaped contact with a translationally movable ignition electrode arranged in the center.
Figure 6:
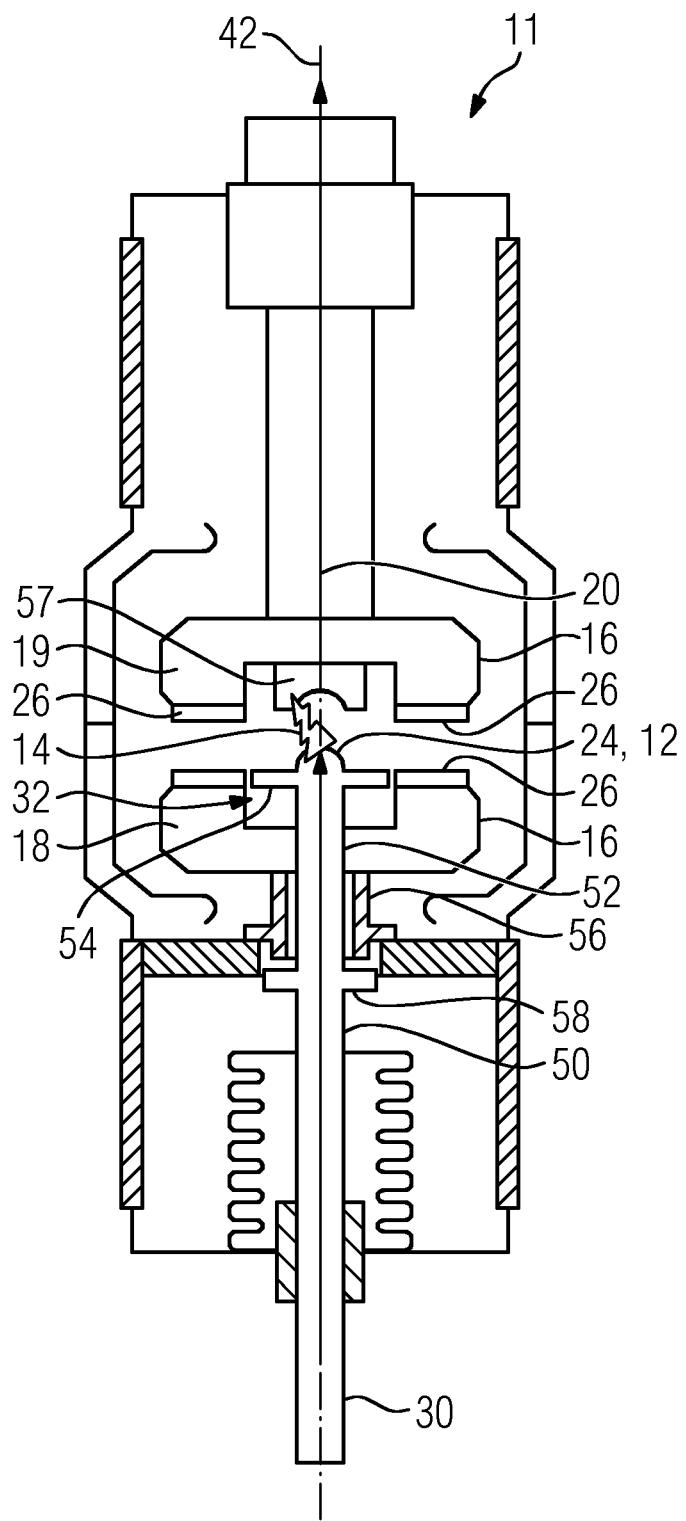
FIG. 6 shows a vacuum circuit breaker tube in accordance with FIG. 5 with an axially displaced ignition electrode and an ignited arc.
Figure 7:
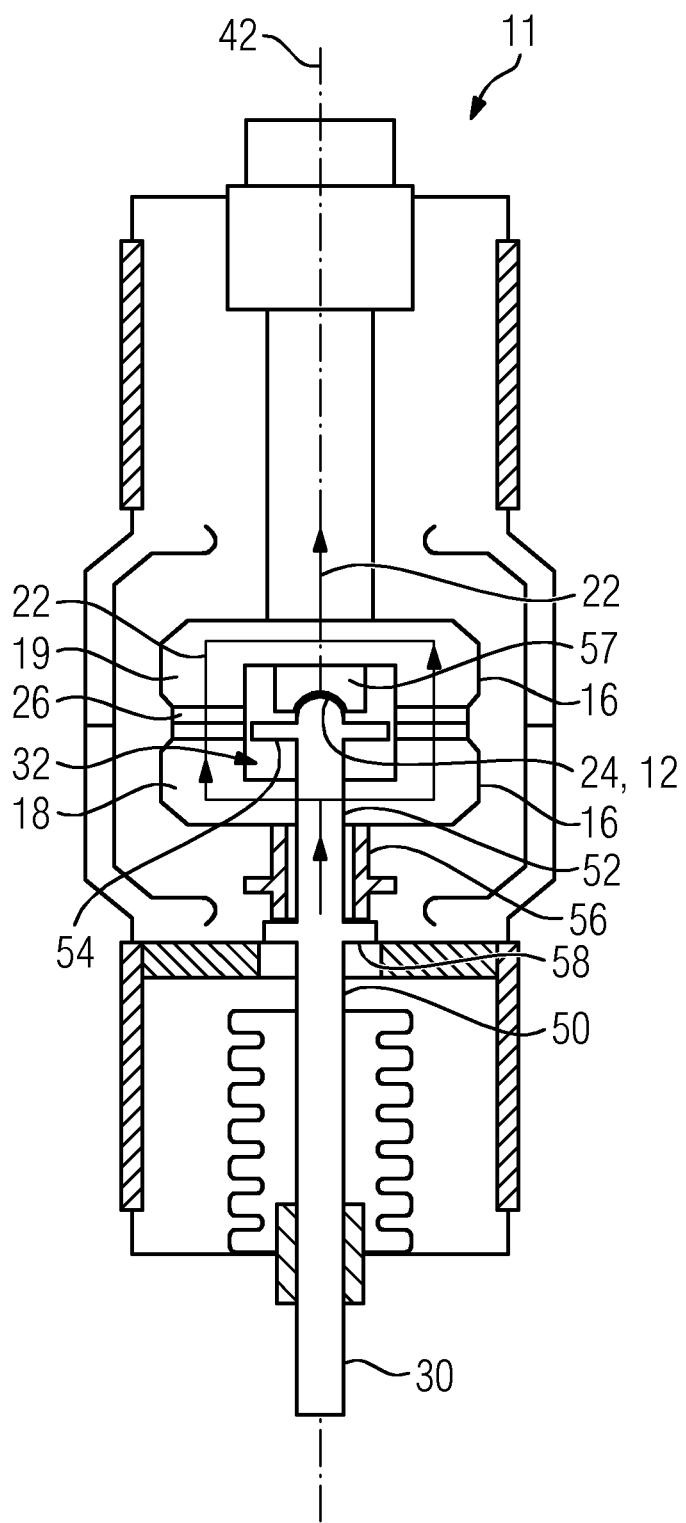
FIG. 7 shows a vacuum circuit breaker tube in accordance with FIG. 6 with a closed contact system.

FIGS. 3 and 4 show a contact system in which the arc 14 is ignited purely electrically by way of the ignition electrodes 24 by means of a corresponding current or a voltage being applied. The ignition electronics 25 serve to communicate a signal that triggers this provision of the current or voltage at the ignition electrodes 24. Said ignition electronics are not necessarily integrated into the vacuum circuit breaker tube 11. Both the ignition electrodes 24 and the ignition electronics 25 are part of the pre-arcing device 12. FIGS. 5-7 then illustrate an alternative possibility for generating the arc. This involves a mechanical system, wherein the arc is ignited by the ignition electrode 24 being moved very rapidly in the direction of the mating contact and field boosting thus occurring, which leads to the ignition of the arc. In this case, the pre-arcing device in accordance with FIGS. 5-7 also may have pre-arcing electronics as well as the ignition electrodes.

The circuit breaker tube 2 in accordance with FIG. 5 likewise comprises two contacts of an alternative contact system 16, having a moving contact 18 and a fixed contact 19, these contacts being configured in a pot-shaped fashion as viewed from the cross section. That is to say that they have a depression 32 in their center. A pre-arcing contact 34 is arranged in the depression 32 of the moving contact 18. Said pre-arcing contact 34 constitutes the ignition electrode 24. In this case, the pre-arcing contact 34 may not touch a counterpart 57 in the fixed contact 19, in order to avoid instances of welding.

The pre-arcing contact 34 is connected to a push rod 50, which is introduced through a hole 52 in the contact base 54 of the pot-shaped moving contact 18 and is mounted there movably along a switching axis 42. Furthermore, the circuit breaker tube 11 comprises a push tube 56, which is able to be mechanically coupled to the movement of the contact pin 30 by a driver 58 at the contact pin 30 or at the push rod 50. This coupling then brings about the translational movement of the moving contact 18 in the direction of the fixed contact 19.

Firstly, the contact pin 30 moves upward in the illustrated view in FIG. 5. This means counter to the gravitational force in the illustration in accordance with FIG. 5; an analogous design in the opposite direction, along the gravitational force, is likewise expedient. In this case, firstly the pre-arcing contact 34 is moved by the contact pin 30, where it should be noted that the pre-arcing contact 34 has a significantly lower mass than the system of the moving contact 18 and the push tube 56. Consequently, the pre-arcing contact 34 moves in the direction of its counterpart 57, wherein, as illustrated in FIG. 6, an arc 14 ignites when the pre-arcing contact 34 emerges from a shielding effect of the moving contact 18 or from the depression 32. Given a suitable setting, this movement proceeds in a few milliseconds. It is thus possible that after approximately 1-3 milliseconds the arc current path 32 for conducting an electric current is effected by way of the arc 14 through the circuit breaker tube 11. Corresponding fast drives, preferably a bounce-free drive, are advantageous for this, which are not illustrated here, but are known from the prior art. They in turn can ensure a movement of the pre-arcing contact 34 and formation of the arc 14 in the time ranges mentioned. A bounce-free drive can be obtained, in particular, by the kinetic energy of the moving contact upon impinging on the fixed contact being temporarily stored in a spring device (not illustrated here) of the drive unit (this includes mechanical springs or gas pressure springs) or being converted into a different form of energy such as heat.

FIG. 6 then illustrates the next step. The contact pin 30 or the driver drive 58 has then also reached the push tube 56 during its translational movement and thereupon pushes the moving contact 18 in the direction of the fixed contact 19, with the result that the contact surfaces 26 of the contacts 18 and 19 lie one on top of another and a flow of a continuous current occurs (FIG. 7). Depending on the application of the circuit breaker tube 11 and depending on operating situations, faults or short-circuit currents can also flow via a continuous current path 22.

LIST OF REFERENCE SIGNS

1 Grid influencing system
2 Power flow controller
3 Series compensation system
4 Power supply grid
5 Contact system
6 Grid influencing component
8 Short-circuiting device
10 Vacuum circuit breaker
11 Vacuum circuit breaker tube
12 Pre-arcing device
13 Housing
14 Arc
16 Contact system
18 Moving contact
19 Fixed contact
20 Arc current path
22 Continuous current path
24 Ignition electrode
25 Ignition electronics
26 Contact surfaces
30 Contact pin
32 Depression
34 Pre-arcing contact
36 Switching axis
38 Contact piece
40 Contact surface of arc current path
42 Switching axis
44 Fingerlike extensions
46 Vapor layer
48 Flanks
50 Push rod
52 Hole
54 Contact base
56 Push tube
57 Counterpart
58 Driver

What is claimed is:

1. A grid influencing system for a power supply grid, the system comprising:
   a current-conducting grid influencing component including a unified power flow controller;
   a vacuum circuit breaker including a vacuum circuit breaker tube containing an at least partly integrated pre-arcing device for actively generating an arc between two contact surfaces; and
   an ignition electrode for igniting the arc along an arc current path;
   wherein the unified power flow controller comprises:
      a first transformer to tap energy off of the power supply grid; and
      a second transformer influencing an impedance of the power supply grid by altering a phase angle between a current of the power supply grid and a voltage of the power supply grid.

2. The grid influencing system as claimed in claim 1, wherein:
   the two contact surfaces are movable translationally with respect to one another; and
   the arc current path and a continuous current path geometrically are separated from one another at least in a contact region.

3. The grid influencing system as claimed in claim 2, further comprising
   a moving contact surface and a fixed contact surface; and
   a contact pin operable to mechanically couple a drive unit to the moving contact surface;
   wherein the contact pin is mechanically coupled to a pre-arcing contact movable translationally along a switching axis independently of the moving contact.

4. The grid influencing system as claimed in claim 1, wherein the contact surfaces in a closed state of the circuit breaker are arranged with no contact with respect to one another.

* * * * *